(12) United States Patent
Wen et al.

(10) Patent No.: US 10,104,401 B2
(45) Date of Patent: Oct. 16, 2018

(54) EFFICIENT SOFTWARE FOR TRANSCODING TO HEVC ON MULTI-CORE PROCESSORS

(71) Applicant: NANJING YUYAN INFORMATION TECHNOLOGY LTD.

(72) Inventors: Jiangtao Wen, La Jolla, CA (US); Yucong Chen, Beijing (CN); Ziyu Wen, Beijing (CN); Tong Shen, Beijing (CN)

(73) Assignee: NANJING YUYAN INFORMATION TECHNOLOGY LTD., Nanjing (CN)

( * ) Notice: Subject to any disclaimer, the term of this patent is extended or adjusted under 35 U.S.C. 154(b) by 282 days.

(21) Appl. No.: 14/663,218

(22) Filed: Mar. 19, 2015

(65) Prior Publication Data

US 2015/0271531 A1 Sep. 24, 2015

Related U.S. Application Data

(60) Provisional application No. 61/955,932, filed on Mar. 20, 2014.

(51) Int. Cl.
*H04N 19/96* (2014.01)
*H04N 19/176* (2014.01)
*H04N 19/196* (2014.01)
*H04N 19/103* (2014.01)
*H04N 19/157* (2014.01)
*H04N 19/436* (2014.01)
*H04N 19/40* (2014.01)
*H04N 19/52* (2014.01)
(Continued)

(52) U.S. Cl.
CPC ........... *H04N 19/96* (2014.11); *H04N 19/103* (2014.11); *H04N 19/157* (2014.11); *H04N 19/176* (2014.11); *H04N 19/196* (2014.11);

*H04N 19/40* (2014.11); *H04N 19/436* (2014.11); *H04N 19/52* (2014.11); *H04N 19/593* (2014.11); *H04N 19/625* (2014.11)

(58) Field of Classification Search
CPC .... H04N 19/52; H04N 19/593; H04N 19/625; H04N 19/96; H04N 19/40; H04N 19/196; H04N 19/103; H04N 19/157; H04N 19/436; H04N 19/176
USPC ..................................................... 375/240.16
See application file for complete search history.

(56) References Cited

PUBLICATIONS

European Patent Office, European Search Report for Application No. EP 15160105.1, Apr. 28, 2016, 9 pages.

(Continued)

*Primary Examiner* — Nguyen Truong
(74) *Attorney, Agent, or Firm* — Gokalp Bayramoglu

(57) ABSTRACT

The latest High Efficiency Video Coding (HEVC) standard achieves significant compression efficiency improvement over the H.264 standard, at a much higher cost of computational complexity. A framework for software-based H.264 to HEVC transcoding on multicore processors and distributed systems is provided. By utilizing information extracted from the input H.264 bitstream, the transcoding process can be accelerated at a high ratio with modest visual quality loss. Wavefront Parallel Processing (WPP) and SIMD acceleration are also implemented to improve the trans coding efficiency on multi-core processors with SIMD instruction set extensions. Based on the HEVC HM 12.0 reference software and using standard HEVC test bitstreams, the proposed transcoder can achieve around 120× speed up over decoding and re-encoding based on ffmpeg and the HM software without significant R-D performance loss.

19 Claims, 11 Drawing Sheets

(51) Int. Cl.
*H04N 19/593* (2014.01)
*H04N 19/625* (2014.01)

(56) References Cited

PUBLICATIONS

Tong Shen et al., "Ultra Fast H.264/AVC to HEVC Transcoder", Mar. 20, 2013, pp. 241-250.
Henryk Richter et al., "Architectural Decomposition of Video Decoders for Many Core Architectures", Oct. 23, 2012, pp. 1-8.
Antonio Jesus Diaz-Honrubia et al., "Multiple Reference Frame Transcoding from H.264/AVC to HEVC", Jan. 6, 2014, pp. 593-604.

(A) (B)

(C) (D)

to a plurality of independently decodable Group of Pictures (GOPs) for processing in parallel; for each of the GOPs, processing a plurality of coding tree units (CTUs) by: determining encoding parameters of respective CTUs using encoding information extracted from the previously encoded bitstream; and encode the CTUs of the respective GOPs into respective GOP-H.265/HVEC bitstreams using the deter-# EFFICIENT SOFTWARE FOR TRANSCODING TO HEVC ON MULTI-CORE PROCESSORS

CROSS REFERENCE TO RELATED APPLICATIONS

This application claims priority to U.S. Provisional Patent Application No. 61/955,932 filed Mar. 20, 2014, the entire contents of which are hereby incorporated by reference.

STATEMENT RE: FEDERALLY SPONSORED RESEARCH/DEVELOPMENT

Not Applicable.

BACKGROUND OF THE INVENTION

The current application is directed to providing an H.265/HEVC encoded video and in particular to transcoding a previously encoded video to H.265/HEVC.

The latest High Efficiency Video Coding (HEVC) standard developed by Joint Collaborative Team on Video Coding (JCT-VT) was designed to succeed the H.264/AVC standard with about 50% improvement in compression efficiency. It is rapidly being adopted in many applications as a result of its superior compression performance. However, compared with the H.264/AVC standard, the computational complexity of HEVC encoding is extremely high, making it hard to be implemented in software on general purpose processors widely used in cloud-based multimedia encoding/transcoding systems and also limiting its adoption in real-time systems.

Because of the large amount of existing legacy content already encoded with the H.264/AVC standard, a transcoder transcoding pre-encoded H.264/AVC bitstreams into HEVC bitstreams rapidly may be of great value.

SUMMARY OF THE INVENTION

In accordance with the present disclosure, there is provided a method for generating an H.265 HEVC bitstream by parsing a previously encoded bitstream into a plurality of independently decodable Group of Pictures (GOPs) for processing in parallel; for each of the GOPs, processing a plurality of coding tree units (CTUs) by: determining encoding parameters of respective CTUs using encoding information extracted from the previously encoded; and encoding the CTUs of the respective GOPs into respective GOP-H.265/HVEC bitstreams using the determined encoding parameters; and combining the respective GOP-H.265/HVEC bitstream for respective GOPs into a the H.265/HEVC bitstream.

In accordance with the present disclosure, there is further provided a system for generating an H.265/HEVC bitstream comprising: at least one processing unit for executing instructions; and at least one memory unit storing instructions, which when executed by the at least one processor unit configure the system to: parse a previously encoded bitstream into a plurality of independently decodable Group of Pictures (GOPs) for processing in parallel; for each of the GOPs, processing a plurality of coding tree units (CTUs) by: determine encoding parameters of respective CTUs using encoding information extracted from the previously encoded bitstream; and encode the CTUs of the respective GOPs into respective GOP-H.265/HVEC bitstreams using the determined encoding parameters; and combine the respective GOP-H.265/HVEC bitstream for respective GOPs into a the H.265/HEVC bitstream.

DETAILED DESCRIPTION OF THE INVENTION

There is a large amount of existing content already encoded with the H.264/AVC (Advanced Video Coding) standard, referred to further simply as H.264. A transcoder transcoding pre-encoded H.264 bitstreams into H.265/HEVC, referred to further simply as HEVC (High Efficiency Video Coding), bitstreams rapidly is of great value, especially before low cost, good quality HEVC encoders become widely available, and/or before HEVC becomes universally supported for devices such as set-top-boxes, tablets and mobile phones and in applications such as streaming video over networks. There are inherent similarities between the H.264 and the HEVC standards that allow information to be re-used when transcoding in order to speed up the process. In addition to using a transcoder to transcode existing H.264 encoded files, an H.264 encoder working in tandem with an H.264 to HEVC transcoder as described herein may provide a cost-effective means of conducting HEVC encoding for many applications in the absence of dedicated HEVC encoders. Although the subsequent is directed at H.264/AVC to HEVC transcoding, the same techniques described may be applied to transcoding from the MPEG-2, H.263, VP8/VP9, and AVS video coding standards to HEVC, or cascade an MPEG-2, H.263, VP8/VP9 and AVS encoder with a transcoder to HEVC to facilitate HEVC encoding from raw uncompressed video. All these coding standards share a similar bitstream structure as for H.264/AVC.

An H.264 to HEVC transcoder for multi-processor and multi-core platforms is described that utilizes partition sizes, prediction modes, reference pictures, motion vector (MV) information and other information extracted from the input H.264 bitstream to expedite the composition of the output HEVC bitstream. Various fast algorithms for performing key encoding tasks are also described. Experiments using standard HEVC test bitstreams shows that the described transcoder is capable of achieving around a 120:1 speed up ratio over the HM 12.0 HEVC reference software without significant loss in the rate distortion (RD) performance, which corresponds to a speed for H.264 to HEVC transcoding for 480p at 20 fps, 720p at 12 fps and 1080p at 4 fps on a server with an Intel Qual Core 3.30 GHz Haswell CPU and 32 GB of RAM with 55%-75% CPU usage.

Figure 1:
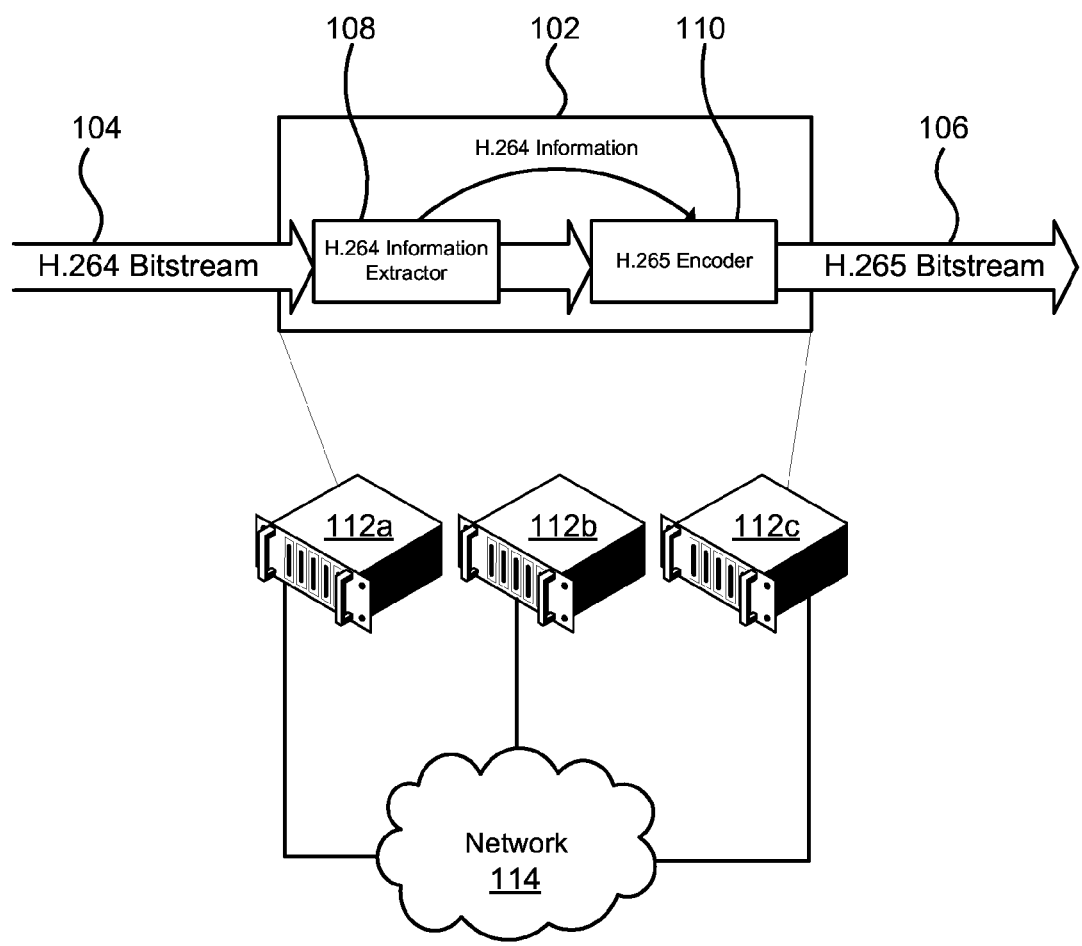
FIG. 1 depicts a transcoder system.

FIG. 1 depicts a transcoder system. The transcoder system 100 comprises transcoder functionality 102 that receives a H.264 bitstream 104 and outputs a HEVC bitstream 106. The transcoder functionality includes functionality 108 that extracts H.264 including encoded picture frames and decoding information from the bitstream 104. The decoding information may include for example, partition sizes, prediction modes, reference pictures, and motion vector (MV) information. The extracted information is used by HEVC encoding functionality 110 in order to speed up the encoding process. For the heterogeneous transcoder described herein, both the bitrate and the bitstream format of the output are different from the input, while the resolution remains unchanged.

As depicted in FIG. 1, the transcoder functionality 102 can be implemented across a plurality of computing systems 112a, 112b, 112c connected together by a network 114, such as a gigabit Ethernet network. The computing systems 112 may be identical systems, although they need not be. The systems 112 may use Intel Core i7 processors with 8 GB of RAM. It will be appreciated that the systems 112 may utilize different hardware including slower hardware, although processing times for producing the output bitstream will increase.

The transcoder functionality described herein utilizes a multi-level architecture. The transcoder comprises four levels, namely a Group of Pictures (GOP) distribution level that allows for parallel processing of GOPs, a high-level parallel processing level implementing wavefront parallel processing (WPP), a mid-level fast partition and mode decision level to expedite the partitioning and mode determination and low-level SIMD acceleration level for accelerating the low level calculations used in coding blocks.

Figure 2:
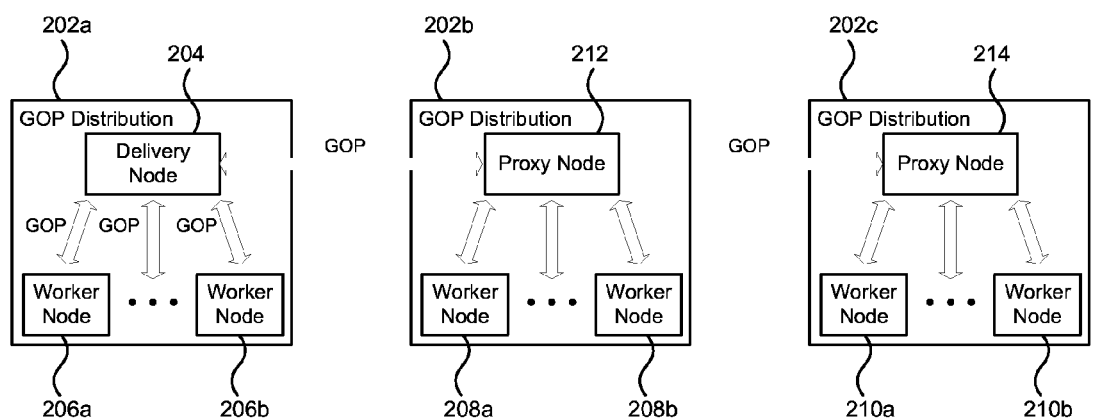
FIG. 2 depicts the GOP distribution level functionality.

FIG. 2 depicts the GOP distribution level functionality. The GOP distribution level functionality 200 comprises transcoder functionality 202a, 202b, 202c which can run on separate processors. As depicted, one of the processors runs a delivery node 204 that receives the H.264 bitstream and divides the input bitstream into GOPs that are independently encoded. The delivery node 204 distributes the GOPs to worker nodes for processing. The worker nodes may be located on the same processor as the delivery node 204, such as worker nodes 206a, 206b or the worker nodes may be located on different computing nodes in a distributed system running the transcoder software, such as worker nodes 208a, 208b, 210a, 210b. The delivery node 204 may distribute the GOPs to worker nodes directly, or may distribute the GOPs to proxy nodes 212a, 212b which may in turn deliver the GOPs to the associated individual worker nodes that perform the transcoding of the GOPs. The worker nodes process the respective GOPs and return the output to the delivery node, which combines the outputs into the HEVC bitstream. The GOP distribution level functionality make it possible for the transcoder to run on multiple processors and multiple threads without visible loss in RD performance. The worker node and the delivery note need not be physically running on separate processors.

Because the requirement for the computational power for real time video encoding/transcoding often exceeds what is available in existing single servers, distributed systems are introduced with the workload distributed to multiple nodes. A GOP is a group of pictures containing a leading Instantaneous Decoder Refresh (IDR) frame and consecutive P, I, and B frames that are encoded independently from other frames in the input video clip. Because of the independence, GOPs can be treated as individual stream segments and distributed to a different system of multiple processing nodes for parallel processing. This level of parallelism introduces no RD loss, but increases the latency of the overall system. The latency can be calculated as:

$$Latency = \frac{GOPSize \times NumOfWorkerNodes}{Framerate} \quad (1)$$

A GOP-based Parallel Processing on the distributed system as depicted in FIG. 2 was implemented; however instead of 3 processors 11, identical systems with Intel Core i7 processors (Quad Core 2.3 GHz, up to 3.3 GHz, 16 GB RAM) interconnected with high speed ethernet at 1 Gbps were used. One of the 11 processors was used as the master/delivery node, while the remaining 10 were used as proxy/worker nodes. When performing H.264 to HEVC transcoding, the input H.264 bitstream was parsed into GOPs by the delivery node, each of which were then sent to one of the worker nodes running the transcoder functionality described further herein. The delivery node then collects the output HEVC bitstreams from the worker nodes, order them in the correct sequence to compose an HEVC output bitstream for the input. In the tested implementation, GOPs of 20 frames were used, corresponding to a system latency of 6.7 seconds, and achieved real-time transcoding of 4k@60 fps H.264 to HEVC with roughly 3 dB loss of Peak Signal to Noise Ratio (PSNR). This corresponds to a transcoding speed of 3 fps on each of the worker nodes. As the data that are transferred between delivery and the worker nodes in both directions are compressed, the cost of transferring data is negligible compared with the actual processing for the transcoding.

Figure 3:
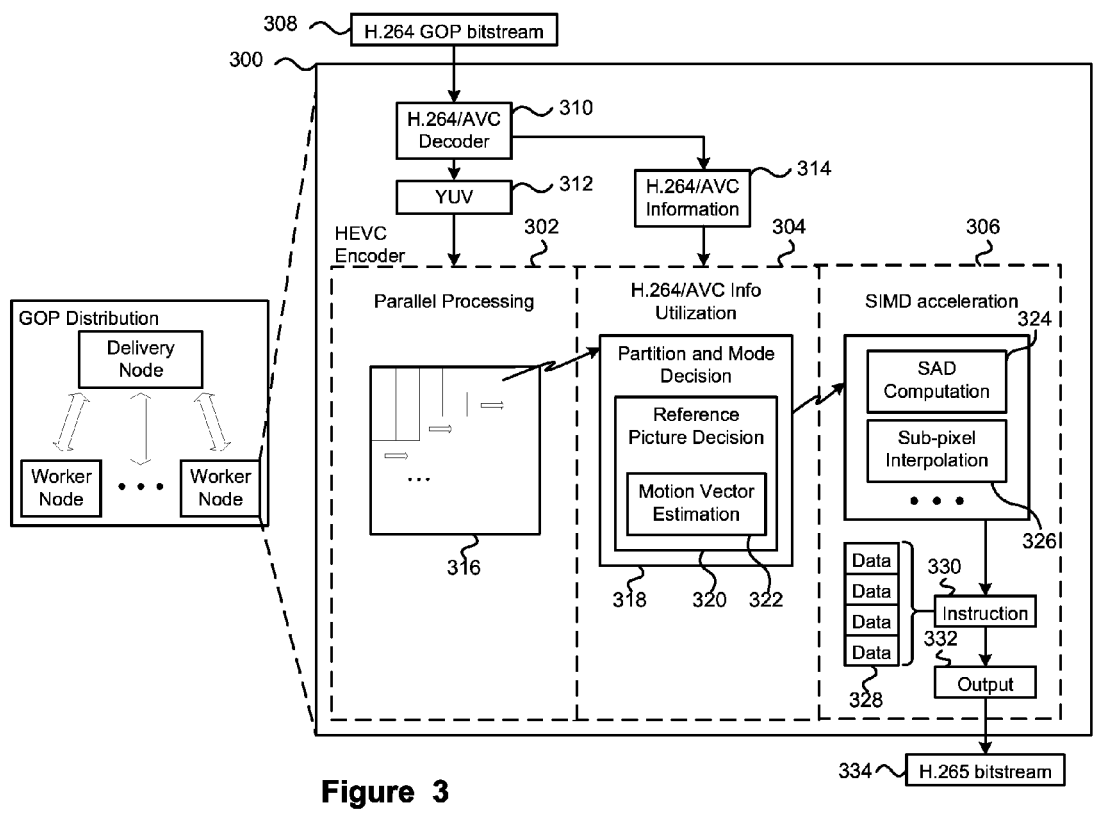
FIG. 3 depicts functionality provided by an encoding worker node.

FIG. 3 depicts functionality provided by an encoding worker node. The functionality 300 is depicted as being provided by a worker node associated with the delivery node, however the same or similar functionality would also be provided by the other worker nodes.

As depicted in FIG. 3, an H.264 GOP bitstream 308 is received and processed by an H.264 decoder 310 to produce YUV picture information 312 and corresponding H.264 encoding information 314. The picture information 312 is processed in order to encode the Coding Tree Units (CTUs) corresponding to one or more macroblocks (MBs) from the encoded H.264 bitstream. The CTU processing is done using WPP 316 as described further with reference to FIG. 4, allowing the CUs to be processed in parallel. Each of the CUs is processed using the H.264 encoding information 314, which is used to speed up the partitioning and mode decision making 318, the reference picture selection 320 as well as the motion vector estimation 322. The context-adaptive binary arithmetic coding (CABAC) coding of the CTUs, or rather the individual CUs of the CTU, may be done by the SIMD acceleration functionality 306, which uses SIMD acceleration, as well as assembly-level acceleration for sum of absolute differences (SAD) computations 324 and sub-pixel interpolation 326. As depicted, the SIMD acceleration allows multiple pieces of data 328 to be processed by a single instruction 330. The output 332 of encoding the CUs is assembled into an HEVC GOP bitstream which is provided to the delivery node and combined with other GOP bitstreams to provide the HEVC bitstream of the video.

The functionality provides H.264 to HEVC transcoding through multi-level processing in order to accelerate the transcoding process. As depicted there is high-level block parallel processing functionality 302 providing WPP of CTUs, mid-level H.264 information utilizing functionality 304, and low-level SIMD acceleration functionality 306. The parallel processing functionality allows the WPP processing of CTUs. The H.264 information utilizing functionality makes use of the information extracted from input H.264 bitstream, including partition sizes, prediction modes, reference pictures and motion vectors, to expedite the partitioning, mode decision and motion estimation processes, which typically consume most of the computational power in the encoding process. The SIMD and assembly accelerations functionality further optimize SIMD-friendly vector operations using instruction set support in the processor. For experimental evaluations, the transcoder was implemented based on HEVC reference software HM 12.0, and integrated into the FFMPEG package as a custom encoder with information passing from the H.264 decoder to the HEVC encoder.

Most of the widely used video coding standard utilize a hybrid discrete cosine transform (DCT) and block-based motion compensation (MC) framework. There are mainly two levels of processing parallelism in these coding standards, namely the slice-level parallelism and the block level parallelism. In the HEVC standard, tiles and slices are defined to divide one frame into spatial partitions that are encoded independent of each other. The encoding tasks of different slices or tiles can be processed in paralleled. However, because the spatial redundancies between tiles and slices cannot be utilized in the encoding process, the more slices and tiles contained in a frame, the faster the encoding speed but the lower the video coding efficiency.

Block-level parallelism, on the other hand, does not introduce such inherent loss to video coding efficiency, but is hard to exploit due to the strong dependencies between the blocks. In HEVC, the Wavefront Parallel Processing (WPP) strategy is optionally used, so that for a Coding Tree Unit (CTU), the predictions are only dependent on the reconstructed CU on its top-right neighbor CTU, and the context models for the CABAC entropy coder are dependent only on the previous CTD. By starting encoding a CTU immediately after its top-right CTU has been encoded, the prediction dependency is satisfied, while the entropy coding dependency is resolved by initializing the context model for each row. WPP allows CTUs to be encoded in parallel with almost no effect on the compression of each CTU. The CTUs can be encoded in parallel as long as the CTUs in the row above and to the right have already been encoded. WPP processing is included in the transcoder framework described herein due to its good speed-coding efficiency tradeoff.

Figure 4:
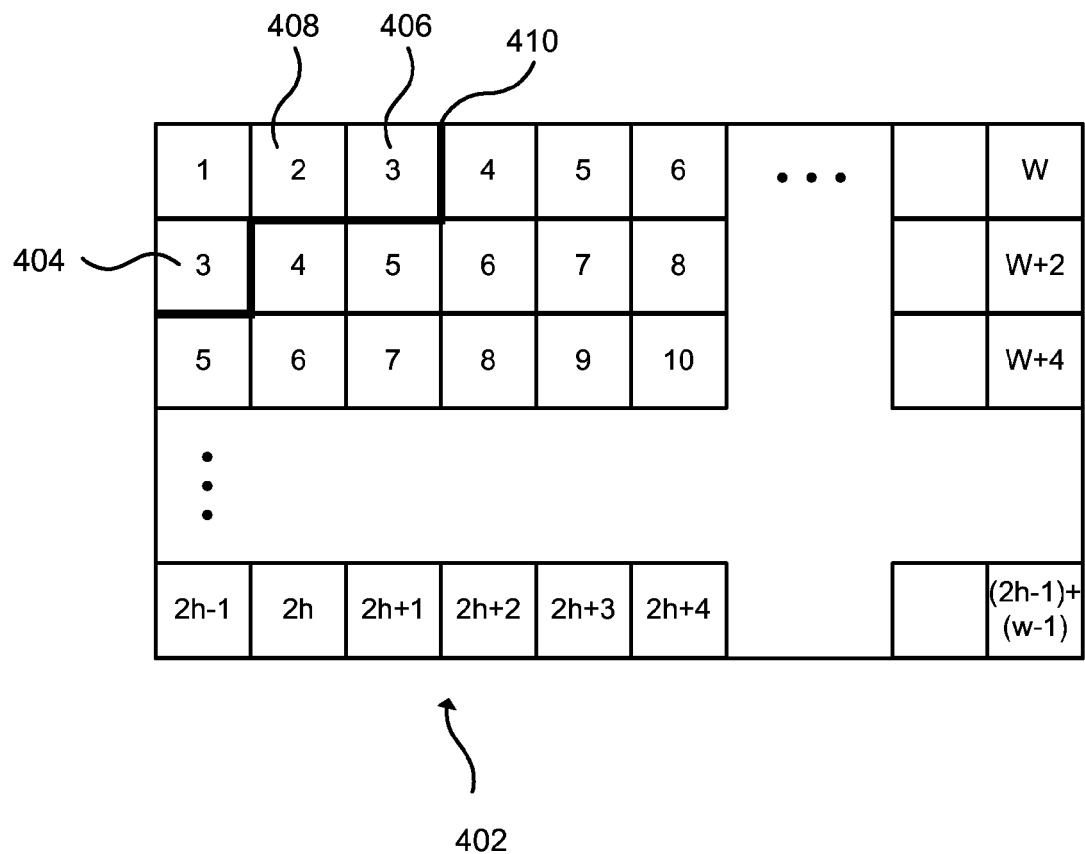
FIG. 4 depicts wavefront parallel processing of CUs.

FIG. 4 depicts wavefront parallel processing of CTUs. Considering only the time for required for Coding Unit (CU) encoding, when WPP is enabled, the encoding of a CU 402 can start as soon as its neighbor on the top-right has been encoded. For example, both the first CU 404 in the second row and the third CU 406 in the first row can be encoded immediately following the second CU 408 in the first row. Let w and h be the number of CUs in the frame width and height, then the order of encoding for the CUs is illustrated in FIG. 4, where CUs with a smaller index will be encoded earlier, while the encoding for CTUs with the same index can be processed in parallel. The thick line 410 depicts the wavefront of processing of the CTUs.

Assuming each CU requires the same encoding time, the speedup ratio of the WPP scheme illustrated in FIG. 4 is w*h/(2h+w−2), which is roughly 5.7 for 720p video and a MaxCUSize of 64. For 1080p video and MaxCU Size=64, the ratio is 8.2. Considering that most mainstream servers have 4 to 8 cores, such a speedup is sufficient for fully utilizing a multi-core processor using WPP.

Because of the dependencies between the CUs in WPP, in order to reach higher thread concurrency, upper threads (CUs) should be scheduled with higher priority to decrease waiting time for dependent CUs. For example, in experiments, if all the threads (i.e. CUs or Substreams) have the same priority, a thread goes into waiting status more frequently because the data it is dependent on (which is from its upper and right CU) is less likely ready and hence causes more threading overhead than in the upper thread-higher priority strategy.

Figure 5:
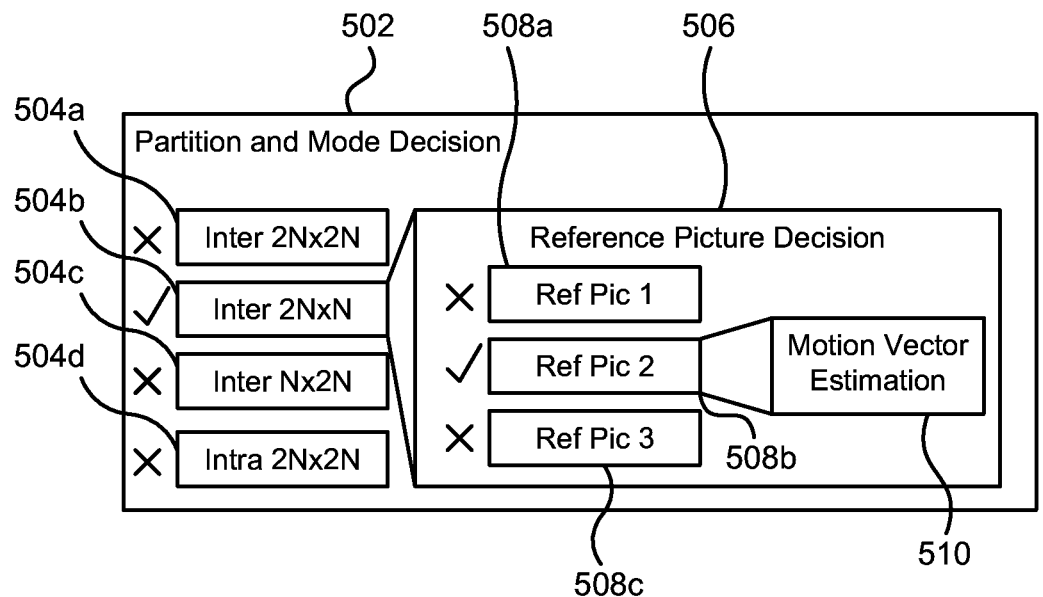
FIG. 5 depicts the multistage utilization of H.264/AVC information.

FIG. 5 depicts the multistage utilization of H.264 information. Due to the inherent similarities between H.264 and HEVC, most of the H.264 bitstream encoding information can be reused when transcoding from H.264 to HEVC. The encoding information may include partition size, prediction mode, reference pictures, and motion vectors. In the current transcoder, the utilization of the H.264 information for processing a CU is divided into several stages, as is shown in FIG. 5, namely partition and mode decision stage 502, reference picture decision 506 and motion vector estimation 510. Only after the processing of the previous stage has been completed is the information of the next stage processed. The partition sizes and mode decisions are processed first, then the reference picture decisions, and finally the motion vectors. If the reference pictures of the Inter macro blocks (MBs) in the input H.264 bitstream corresponding to the CU being processed are used, the corresponding CU should be encoded also in the Inter mode using the same partition size. This allows the H.264 motion vector information to be used, as the extracted MVs will be useless if the CU, or Prediction Units (PUs) reference a different picture than the H.264 input.

One of the improvements of HEVC over the H.264 is the inclusion of more partition sizes that can vary from 4×4 for PUs up to 64×64, compared to 4×4 to 16×16 in H.264. In the current transcoder, CUs smaller than or equal to 16×16 are identified as Legacy CUs, for which there exists a corresponding MB or sub-MB partition in the H.264 for the CU in HEVC. In contrast, CUs larger than 16×16 are identified as Extended CUs, each one of which "covers" multiple MBs in H.264.

Based on experiments, it was concluded that the RD benefit of using the block size of 64×64 is not significant enough to justify the additional computational complexity in the mode decision process. Therefore, the largest CU size may be limited to 32×32 in the transcoder. Thus, there is only one type of Extended CUs, having a size of 32×32, in the current transcoder, with each extended CU covering 4 MBs in H.264. Besides the larger partition size, partitions can be asymmetric in HEVC with Asymmetric Motion Partitioning (AMP). Also from extensive experiments, it was determined that the RD gain from the AMP is limited and therefore may not be supported in the current transcoder.

In contrast to the HM reference software which recursively and exhaustively divides every block to all possible smaller sizes, the partition and mode decision functionality only check a subset of partition sizes based on the input H.264 bitstream.

For an extended CU, partitions and modes are checked according to the 4 MBs that it covers using the following:
  Merge2N×2N mode is always checked.
  Inter2N×2N mode is checked when there exists more than 2 MBs using the Inter16×16 mode.

InterN×2N mode is checked when the left two MBs both use the Inter16×16 mode or right two MBs both use the Inter16×16 mode.

Inter2N×N mode is checked when both the upper two or both the lower two MBs use the Inter16×16 mode.

Intra2N×2N is checked when there exists more than 2 MBs using Intra modes.

Figure 6:
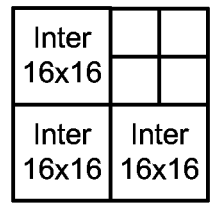
FIG. 6 depicts partition decisions for an extended CU.
Figure 6:
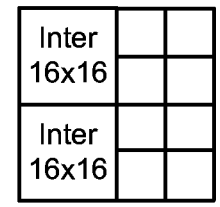
Figure 6:
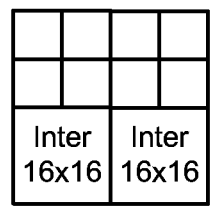
Figure 6:
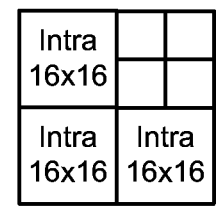

FIG. 6 depicts partition decisions for an extended CU. FIG. 6a depicts an example of when Inter2N×2N is checked. FIG. 6b depicts an example of when InterN×2N is checked. FIG. 6c depicts an example of when Inter2N×N is checked and FIG. 6d is an example of when Intra2N×2N is checked.

For the legacy CUs, only the partition size as used in the corresponding H.264 MB or sub-MB is checked. It is implied that, if the partition size is in current division depth, the partitioning will stop splitting to smaller partitions, or if the partition size is in the next division depth, it will directly go on to the next depth without checking any partitions at the current depth.

Experiments were conducted to evaluate the partition and mode decision algorithms. First, the partitioning of the legacy CUs was tested, with the partition size of the extended CUs selected using an exhaustive search, rather than the fast mode decision described above. As is shown in Table 1, a stable 3.4× overall speedup was achieved by making partition and mode decision on Legacy CUs based on the H.264 bitstream, with a 0.3-0.5 dB PSNR loss when taking into account the changes of bitrate.

Figure 7:
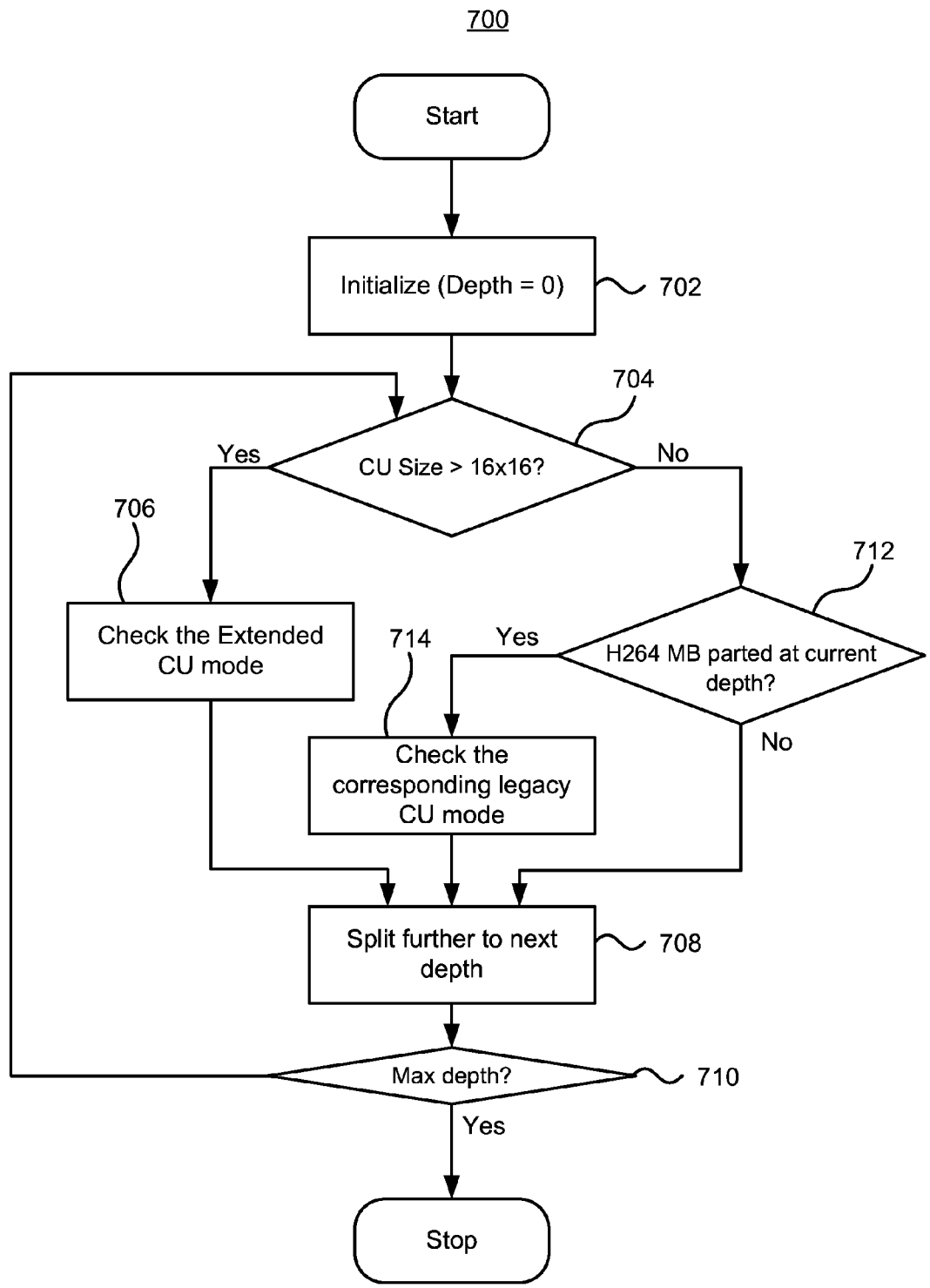
FIG. 7 depicts the fast partition and mode decision algorithm.

FIG. 7 depicts the fast partition and mode decision algorithm. The method 700 is used to determining partition modes for extended CUs. The method sets the initial division depth to 0 (702) and then determines if the CU size is greater than 16×16 (704). For CUs greater than 16×16 (Yes at 704), the extended CU modes are checked (706), based on the modes of the underlying MBs as described above and depicted in FIG. 6, and then the CU is split further to the next depth (708). The method 700 checks to determine if the CU is at the max depth (710) and if it is (Yes at 710) the partitioning and mode decision stops. If the CU size is determined to be 16×16 or less (No at 704), the method determines if the corresponding H.264 MB is partitioned at the current depth (712) and if it is, the corresponding legacy CU mode is checked (714) and then the CU is split further to the next depth (708).

After making the partition and mode decisions, reference pictures are selected. For prediction units (PUs) in legacy CUs, only the reference pictures for the corresponding MB or sub-MB partitions in the input H.264 bitstream are checked. For PUs in extended CUs, all reference pictures for the inter MBs covered by the PU are tried. Further, when transcoding a P slice in H.264 to HEVC, it will be encoded as a B slice in HEVC. Only the reference picture in list_0 (i.e. previous reference frames) in H.264 will be tried, while all the reference pictures in list_1 (i.e. future reference frames) of HEVC will be tried. As is shown in Table 3, by applying the proposed fast reference picture decision, another 1.7× overall speedup can be achieved with less than 0.1 dB PSNR loss.

TABLE 1

Performance with Fast Partition and Mode Decisions for only Legacy CUs

| Video Clip | QP | Before | | | After | | | Speedup(x) |
|---|---|---|---|---|---|---|---|---|
| | | Bitrate(kbps) | PSNR(dB) | Time(s) | Bitrate(kbps) | PSNR(dB) | Time(s) | |
| BQTerrace | 27 | 4574.10 | 41.45 | 1780.5 | 4591.76 | 40.90 | 520.3 | 3.42 |
| (1920 × 1080) | 30 | 2661.32 | 39.36 | 1684.8 | 2644.30 | 38.95 | 493.3 | 3.42 |
| | 33 | 1422.04 | 37.41 | 1629.6 | 1484.38 | 37.15 | 477.8 | 3.41 |
| | 36 | 827.35 | 35.78 | 1594.1 | 887.01 | 35.58 | 467.54 | 3.41 |
| Vidyo1 | 27 | 635.77 | 44.49 | 709.7 | 634.95 | 44.17 | 207.4 | 3.42 |
| (1280 × 720) | 30 | 416.32 | 42.62 | 696.8 | 418.04 | 42.35 | 203.4 | 3.43 |
| | 33 | 284.93 | 40.70 | 688.2 | 288.20 | 40.51 | 201.3 | 3.42 |
| | 36 | 203.99 | 39.13 | 681.4 | 206.01 | 38.88 | 199.5 | 3.42 |

Next, a fast partition and mode decision algorithm for extended CUs was tested, leading to an additional speedup of around 1.7× and minor loss of R-D performance, as shown in Table 2. Combining the algorithms for both legacy and extended CDs, the overall speed up ratio after fast partition size and mode decision was about 5.8× with about 0.5 dB PSNR loss.

TABLE 2

Performance with Fast Partition and Mode Decisions for Both Legacy and Extended CDs

| Video Clip | QP | Before | | | After | | | Speedup(x) |
|---|---|---|---|---|---|---|---|---|
| | | Bitrate(kbps) | PSNR(dB) | Time(s) | Bitrate(kbps) | PSNR(dB) | Time(s) | |
| BQTerrace | 27 | 4591.76 | 40.90 | 520.3 | 4626.90 | 40.89 | 320.8 | 1.62 |
| (1920 × 1080) | 30 | 2644.30 | 38.95 | 493.3 | 2672.79 | 38.94 | 296.4 | 1.66 |
| | 33 | 1484.38 | 37.15 | 477.8 | 1503.10 | 37.13 | 282.5 | 1.69 |
| | 36 | 887.01 | 35.58 | 467.54 | 899.40 | 35.56 | 274.1 | 1.71 |
| Vidyo1 | 27 | 634.95 | 44.17 | 207.4 | 638.78 | 44.14 | 123.3 | 1.68 |
| (1280 × 720) | 30 | 418.04 | 42.35 | 203.4 | 423.43 | 42.33 | 120.1 | 1.69 |
| | 33 | 288.20 | 40.51 | 201.3 | 293.03 | 40.50 | 118.0 | 1.71 |
| | 36 | 206.01 | 38.88 | 199.5 | 210.91 | 38.86 | 116.0 | 1.72 |

TABLE 3

Performance with Fast Reference Picture Decision

| Video Clip | QP | Before | | | After | | | |
|---|---|---|---|---|---|---|---|---|
| | | Bitrate(kbps) | PSNR(dB) | Time(s) | Bitrate(kbps) | PSNR(dB) | Time(s) | Speedup(x) |
| BQTerrace | 27 | 4626.90 | 40.89 | 320.8 | 4703.76 | 40.81 | 205.0 | 1.57 |
| (1920 × 1080) | 30 | 2672.79 | 38.94 | 296.4 | 2723.80 | 38.85 | 182.3 | 1.63 |
| | 33 | 1503.10 | 37.13 | 282.5 | 1535.42 | 37.05 | 169.0 | 1.67 |
| | 36 | 899.40 | 35.56 | 274.1 | 913.05 | 35.46 | 161.1 | 1.70 |
| Vidyo1 | 27 | 638.78 | 44.14 | 123.3 | 641.01 | 44.09 | 71.8 | 1.72 |
| (1280 × 720) | 30 | 423.43 | 42.33 | 120.1 | 423.92 | 42.27 | 67.8 | 1.77 |
| | 33 | 293.03 | 40.50 | 118.0 | 290.02 | 40.45 | 66.1 | 1.79 |
| | 36 | 210.91 | 38.86 | 116.0 | 210.02 | 38.81 | 64.3 | 1.80 |

Figure 8:
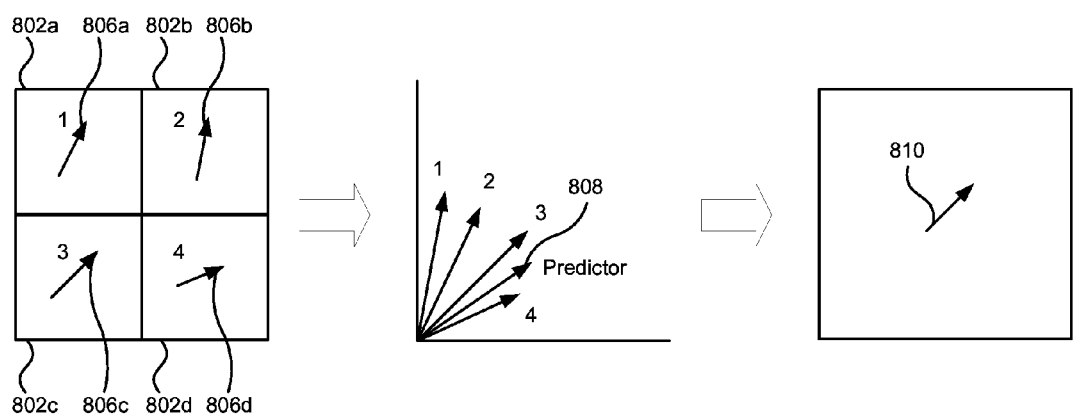
FIG. 8 depicts the estimation of MVs for extended CUs.

FIG. 8 depicts the estimation of MVs for extended CUs. In the transcoder, a legacy CU uses the reference picture of the corresponding MB or sub-MB partition in the input H.264 bitstream, as well as the corresponding MVs in the H.264 bitstream. In contrast, the MVs of an extended CU are estimated using the MVs of all inter MBs covered by the CU together with the MV predictor provided by the HEVC itself, as depicted in FIG. 8. As depicted, the corresponding MBs 802a, 802b, 802c, 802d covered by the CU 804 are associated with respective motion vectors 806a, 806b, 806c, 806d. An HVEC MV predictor 808 is determined. The estimation is made by finding the median of the MVs 806a, 806b, 806c, 806d, 808, where the median 810 is calculated based on the L1 distance (Manhattan distance) from the mean:

$$MV_{mean} = \frac{1}{n}\sum_{i=1}^{n} MV_i \quad (2)$$

$$\|MV_i\| = |x_i - x_{mean}| + |y_i - y_{mean}| \quad (3)$$

where $MV_i=(x_i, y_i)$ is one of the candidate MVs. The fast motion vector estimation lead to around 30% speed up with 2%-3% bitrate growth and about 0.2 dB PSNR loss, as depicted by the results in Table 4.

instruction. x265 is an open-source HEVC encoder project and free application library built on the x264 encoder that has been widely used as a high quality H.264 encoder. The developers of x265 have implemented assembly optimizations of the SAD calculations and interpolation filtering and achieved significant speedups with little quality loss.

Traditionally, to fully exploit the benefit of SIMD instructions support for modern processors, assembly code has to been hand-written or optimized. The x264 and x265 encoder implementations relied heavily on such hand-optimizations. With the advancement of modern state-of-the-art compilers such as the icc (Intel C/C++ Compiler), it is possible to use well-written C/C++ code to produce high quality SIMD code for many applications that previously would have required hand coding, even though there remains a smaller number of algorithms for which carefully hand-crafted assembly code may still provide a benefit. The transcoder may use handwritten code for SAD and HAD calculations, and leave the rest to the compiler.

The interpolation filter and DCT implementations may be further accelerated. Instead of using one C++ template to present the filters with different dynamic parameters to the compiler, each filter may be optimized with handwritten code separately to achieve faster speed than what was possible when relying entirely on the C/C++ compiler. For interpolations, each 10-bit pixel may be represented by a

TABLE 4

Performance with Fast Motion Vector Estimation

| Video Clip | QP | Before | | | After | | | |
|---|---|---|---|---|---|---|---|---|
| | | Bitrate(kbps) | PSNR(dB) | Time(s) | Bitrate(kbps) | PSNR(dB) | Time(s) | Speedup(x) |
| BQTerrace | 27 | 4703.76 | 40.81 | 205.0 | 4856.37 | 40.72 | 163.1 | 1.26 |
| (1920 × 1080) | 30 | 2723.80 | 38.85 | 182.3 | 2786.74 | 38.71 | 140.0 | 1.30 |
| | 33 | 1535.42 | 37.05 | 169.0 | 1567.66 | 36.88 | 126.7 | 1.33 |
| | 36 | 913.05 | 35.46 | 161.1 | 937.05 | 35.28 | 118.8 | 1.36 |
| Vidyo1 | 27 | 641.01 | 44.09 | 71.8 | 671.59 | 43.92 | 54.63 | 1.31 |
| (1280 × 720) | 30 | 423.92 | 42.27 | 67.8 | 441.46 | 42.07 | 51.2 | 1.32 |
| | 33 | 290.02 | 40.45 | 66.1 | 306.49 | 40.24 | 49.2 | 1.34 |
| | 36 | 210.02 | 38.81 | 64.3 | 220.48 | 38.58 | 47.5 | 1.35 |

In addition to the above techniques for accelerating the transcoding of H.264 to H.265, SIMD and assembly level instructions may be optimized. In video encoding, a significant portion of the complexity is related to the Inter prediction due to the Sum of Absolute Difference (SAD) calculation and interpolation filtering, which are suitable for vectorization, and Single Instruction Multiple Data (SIMD) accelerations. Such SIMD accelerations allow a single operation to be carried out on multiple operands in one 16-bit integer and each 8-bit pixel may be represented by a 8-bit integer, while each filter coefficient may be represented by an 8-bit integer. Pixels and filter coefficients may be packed into longer vectors (e.g. 128-bit for SSE and 256-bit for AVX2) and instructions (add, mul, etc.) executed simultaneously, which can be realized by either using C/C++ compiler or using hand-written assembly code.

Two strategies may be applied to further accelerate the SIMD processing. On the one hand, to further exploit the parallelism of the complex nested loop structure in those filters, instructions in the outer-loop may be vectorized, especially when the width of the filter is too small to fill up a SIMD vector. On the other hand, those "pseudo-dynamic parameters" like 10-bit-or-8-bit-pixel mark should be changed into static ones, to achieve further SIMD acceleration. For example, if the picture is of 8-bit depth, it is possible to pack 16 pixels in an 128-bit vector rather than 8 pixels (for 10-bit depth picture), and could achieve a 2× local speed-up theoretically, but the compiler could not "understand" the 8-bit mark if it's stored in a dynamic variable. After taking all these into considerations, C/C++ codes must be well-written for compiler's auto-vectorization.

Experiments were conducted with standard HEVC test clips to evaluate the overall performance of the described transcoder, as measured and presented in both speed and RD performance. A previous transcoder of similar design without all of the described accelerations and the HEVC HM 12.0 reference software as well as the ×264 H.264 (Main Profile) encoder were used as benchmarks.

Overall, the described transcoder is around 120 times faster than fully decoding and then encoding using the HM 12.0 (MaxCUSize limited to 32, AMP disabled), and achieved an average of 40% RD performance gain over the ×264 H.264 encoder using the Main profile and the Medium preset. The tests were done on a server with an Intel Quad Core 3.30 GHz Haswell CPU and 32 GB of RAM.

As is shown in Table 5, by implementing the WPP, the HM 12.0 encoder became about 4.3× faster than the original singlethread version. Table 6 shows that with SIMD and assembly optimizations the encoder could achieve another 2.2× speed up. Our transcoder was based on the optimized HM 12.0 encoder with WPP and SIMD features.

Utilizing the fast decision algorithms described herein, another 12.8× speedup was achieved by fully utilizing the input H.264 information. Thus, overall, the described transcoder was about 120× faster than the HM 12.0 encoder. Comparing with a previous transcoder utilizing the H.264 encoder information, the transcoder described herein is between 2 to 8 times faster, depending on the input bitstream and video resolution, as is shown in Table 7.

TABLE 5

Speedup with WPP

| Video Clip | QP | Before Time(s) | After Time(s) | Speedup(x) |
|---|---|---|---|---|
| BQTerrace (1920 × 1080) | 27 | 17565.5 | 3977.9 | 4.42 |
|  | 30 | 16479.5 | 3825.2 | 4.31 |
|  | 33 | 15643.9 | 3731.4 | 4.19 |
|  | 36 | 15434.4 | 3671.2 | 4.20 |
| Vidyo1 (1280 × 720) | 27 | 6633.4 | 1552.2 | 4.27 |
|  | 30 | 6567.0 | 1533.7 | 4.28 |
|  | 33 | 6493.8 | 1515.8 | 4.28 |
|  | 36 | 6443.3 | 1503.6 | 4.29 |

TABLE 6

Speedup with SIMD and Assembly

| Video Clip | QP | Before Time(s) | After Time(s) | Speedup(x) |
|---|---|---|---|---|
| BQTerrace (1920 × 1080) | 27 | 3977.9 | 1780.5 | 2.23 |
|  | 30 | 3825.2 | 1684.8 | 2.32 |
|  | 33 | 3731.4 | 1629.6 | 2.29 |
|  | 36 | 3671.2 | 1594.1 | 2.30 |

TABLE 6-continued

Speedup with SIMD and Assembly

| Video Clip | QP | Before Time(s) | After Time(s) | Speedup(x) |
|---|---|---|---|---|
| Vidyo1 (1280 × 720) | 27 | 1552.2 | 709.7 | 2.19 |
|  | 30 | 1533.7 | 696.8 | 2.20 |
|  | 33 | 1515.8 | 688.2 | 2.20 |
|  | 36 | 1503.6 | 681.4 | 2.21 |

TABLE 7

Speedup Comparing with Previous Transcoder

| Video Clip | Previous Time(s) | Proposed Time(s) | Speedup(x) |
|---|---|---|---|
| PeopleOnStreet (2560 × 1600) | 341.0 | 144.4 | 2.36 |
| BQTerrace (1920 × 1080) | 535.9 | 140.0 | 3.83 |
| Vidyo1 (1280 × 720) | 245.4 | 51.2 | 4.79 |
| BasketballDrill (832 × 480) | 341.4 | 43.1 | 7.92 |

Figure 9:
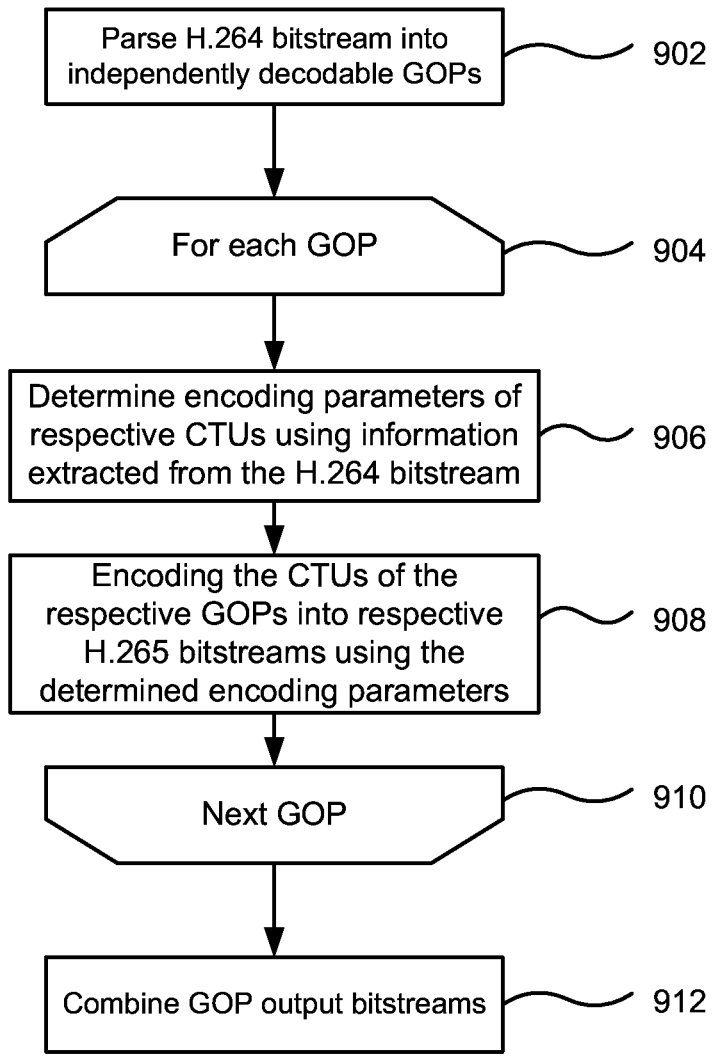
FIG. 9 depicts a method for generating an H.265 HEVC bitstream.

FIG. 9 depicts a method for generating an H.265 HEVC bitstream. The method 900 begins with receiving a parsing an H.264 bitstream into a plurality of independently decodable Group of Pictures (GOPs) for processing in parallel (902). The GOPs may be sent to different processors for further processing. For each of the GOPs (904), the plurality of coding tree units (CTUs) are processed by determining encoding parameters of respective CTUs using encoding information extracted from the H.264 bitstream (906) and encoding the CTUs of the respective GOPs into respective H.265 bitstreams using the determined encoding parameters (908). The next GOP is processed (910). The processing of the GOPs may be done in parallel (910). The encoded CTU bitstreams from the GOPs are combined into a the H.265 HEVC video file (912).

Figure 10A:
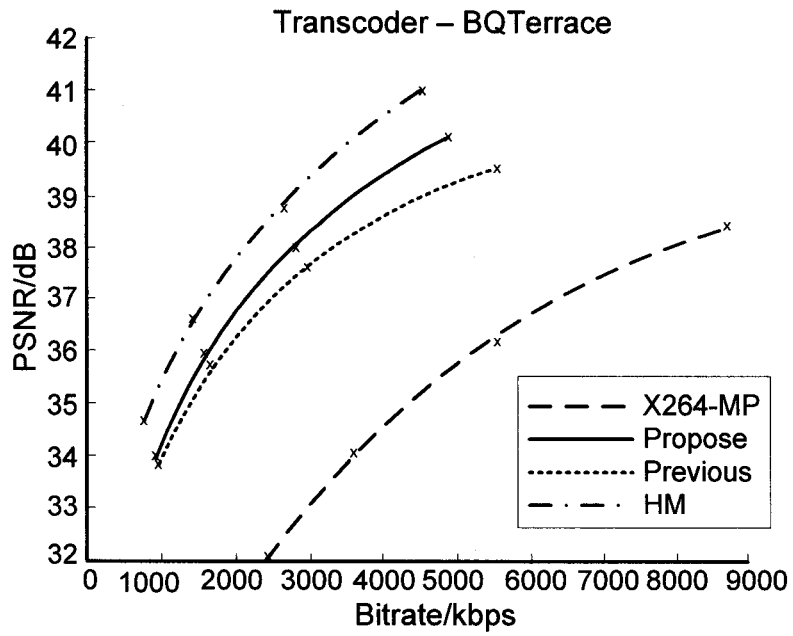
FIGS. 10A and 10B depict results of RD performance.
Figure 10B:
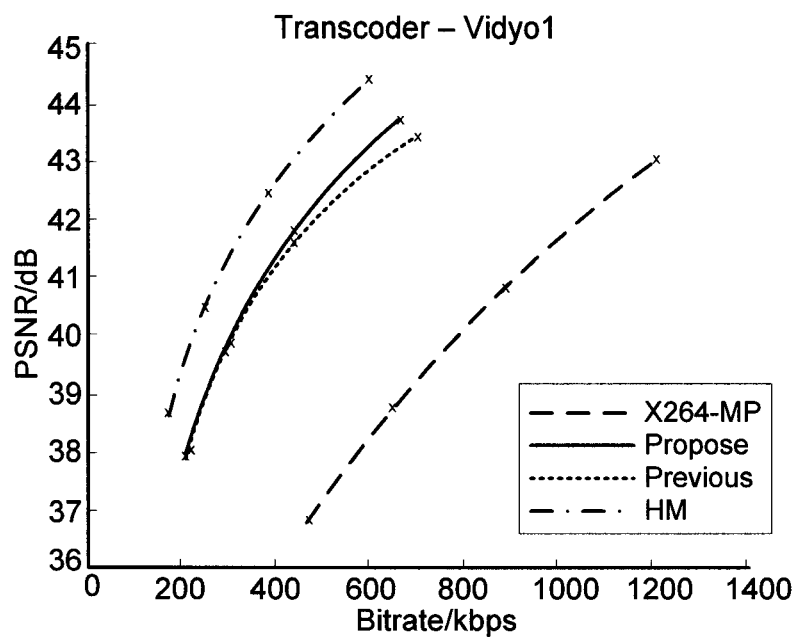
Figure 11A:
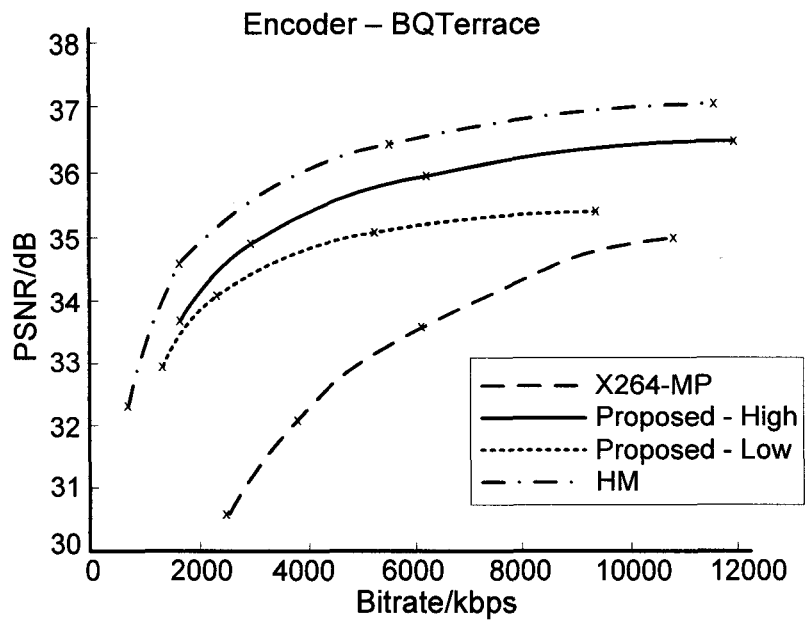
FIGS. 11A and 11B depict results of PSNRs.
Figure 11B:
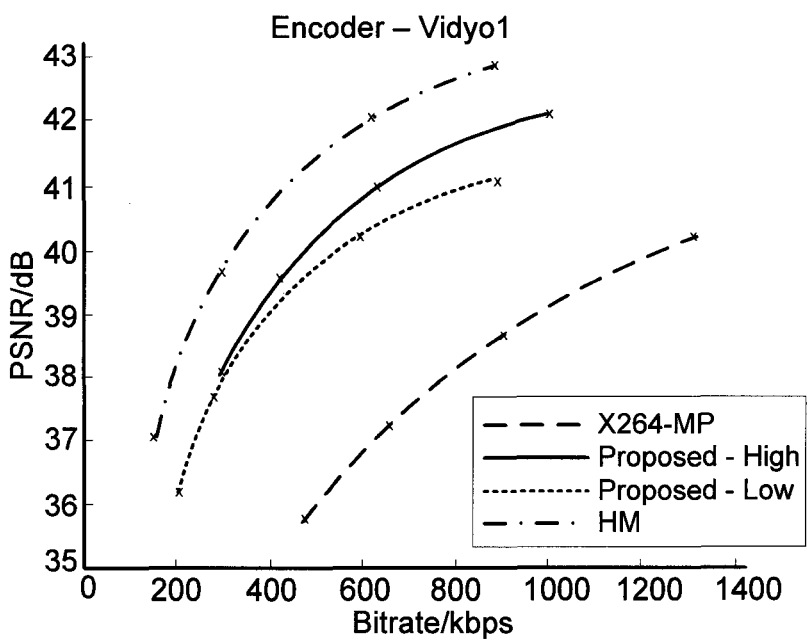

The RD performance of the current transcoder may be examined from two perspectives. First, the RD performance as a transcoder was examined, as shown in FIGS. 10A, 10B, which gives the PSNR change in the transcoding process. In addition, because an HEVC encoder may be implemented by cascading the ×264 H.264 encoder and the current transcoder, the RD performance of the proposed system in a cascaded HEVC encoder is analyzed with the original uncompressed clip available. The PSNRs in FIGS. 11A, 11B are calculated between the original uncompressed sequence and the sequence decoded from the HEVC bitstream generated by the transcoder. Because the PSNR of the transcoder output is always lower than the input H.264 bitstream, improving the quality of the H.264 bitstream (by using lower speed and higher complexity encoding configurations) will result in better over quality, as shown by the Proposed-High and the Proposed-Low curves in FIG. 11.

An optimized H.264 to HEVC transcoder targeting multi-core processors and distributed systems is described herein. By distributing processing across GOPs, utilizing information extracted from the H.264 bitstream, WPP processing as well as SIMD acceleration, the proposed system was able to achieve around 120× speed up compared with the HEVC HM 12.0 reference software and 40% bitrate reduction compared with the widely used ×264 H.264 implementation.

The hardware, software, firmware and combinations thereof providing the above described functionality may reside in the same physical systems, or may be distributed in multiple devices and/or systems.

Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A method of generating an H.265/HEVC bitstream comprising:
   parsing a previously encoded bitstream into a plurality of independently decodable Group of Pictures (GOPs) via a delivery node for processing in parallel, wherein the parsed GOPs are processed by separate multi-core processors;
   sending each of the GOPs to one of worker nodes via a delivery node;
   for each of the GOPs, processing a plurality of coding tree units (CTUs) via one of the worker nodes by:
   determining encoding parameters of respective CTUs using encoding information extracted from the previously encoded bitstream; and
   encoding the CTUs of the respective GOPs into respective GOP-H.265/HVEC bitstreams using the determined encoding parameters;
   collecting the respective GOP-H.265/HVEC bitstreams for respective from the worker node via the delivery node; and
   combining the respective GOP-H.265/HVEC bitstream for respective GOPs into the H.265/HEVC bitstream via the delivery node.

2. The method of claim 1, wherein the encoding parameters comprise partition sizes, prediction modes, reference pictures and motion vectors.

3. The method of claim 1, wherein encoding parameters predicted based on the partition sizes, prediction modes, reference pictures and motion vectors extracted from the previously encoded bitstream are used to expedite mode decision and motion estimation processing when encoding the respective GOP-H.265 bitstreams.

4. The method of claim 1, wherein coding units (CUs) of the plurality of CTUs are processed using Wavefront Parallel Processing (WPP).

5. The method of claim 4, wherein thread priority of threads processing upper row CUs is higher than threads processing lower row CUs.

6. The method of claim 1, wherein each of the plurality of CTUs comprise a plurality of coding units (CU) each identified as one of:
   a legacy CU having a corresponding macro-block (MB) or sub-MB partition in the previously encoded bitstream; and
   an extended CU corresponding to multiple MBs in the previously encoded bitstream.

7. The method of claim 6, wherein the CUs are checked to determine partition size and prediction mode.

8. The method of claim 7, wherein for legacy CUs, a partition size is checked corresponding to a partition size used in the previously encoded bitstream and if the partition size is in a current division depth the partitioning will stop splitting into smaller partitions.

9. The method of claim 7, wherein for extended CUs, partitions and modes are checked based on the MBs covered by the extended CU.

10. The method of claim 9, wherein the partitions and modes checked are:
    Merge2N×2N mode is always checked;
    Inter2N×2N mode is checked when there exists more than 2 MBs using the Inter16×16 mode;
    InterN×2N mode is checked when a left two MBs both use the Inter16×16 mode or right two MBs both use the Inter16×16 mode;
    Inter2N×N mode is checked when both the upper two or both the lower two MBs use the Inter16×16 mode; and
    Intra2N×2N mode is checked when there exists more than 2 MBs using Intra modes.

11. The method of claim 7, wherein after determining the partition size and prediction mode, reference pictures are selected.

12. The method of claim 11, wherein: for Prediction Units (PUs) in legacy CUs, reference pictures for corresponding MB or sub-MB partitions in the previously encoded bitstream are checked; and
    for PUs in extended CUs all reference pictures for the inter MBs covered by the prediction units are checked.

13. The method of claim 11, wherein motion vectors for extended CUs are estimated using a mean of motion vectors of the inter MBs covered by the extended CU and a motion vector predictor determined according to H.265/HVEC.

14. A system for generating an H.265/HEVC bitstream comprising:
    at least one processing unit for executing instructions; and
    at least one memory unit storing instructions, which when executed by the at least one processor unit configure the system to:
    parse a previously encoded bitstream into a plurality of independently decodable Group of Pictures (GOPs) via a delivery node for processing in parallel, wherein the parsed GOPs are processed by separate multi-core processors;
    send each of the GOPs to one of worker nodes via a delivery node;
    for each of the GOPs, processing a plurality of coding tree units (CTUs) via one of the worker nodes by:
    determine encoding parameters of respective CTUs using encoding information extracted from the previously encoded bitstream;
    encode the CTUs of the respective GOPs into respective GOP-H.265/HVEC bitstreams using the determined encoding parameters;
    collect the respective GOP-H.265/HVEC bitstreams for respective from the worker node via the delivery node; and
    combine the respective GOP-H.265/HVEC bitstream for respective GOPs into the H.265/HEVC bitstream via the delivery node.

15. The system of claim 14, comprising a plurality of computer systems coupled together by a gigabit or faster communication network, each comprising respective processing units and memory units, wherein:
    a first computer system of the plurality of computer systems is configured to parse the previously encoded bitstream into the plurality of GOPs and combine the respective GOP-H.265/HVEC bitstream for respective GOPs into the H.265/HEVC bitstream; and
    a second computer system of the plurality of computer systems is configured to process the plurality of CTUs for at least one of the GOPs.

16. The system of claim 15, wherein the first computer system is further configured to process the plurality of CTUs for at least one of the GOPs.

17. The system of claim 14, wherein the encoding parameters comprise partition sizes, prediction modes, reference pictures and motion vectors.

18. The system of claim 14, wherein each of the plurality of CTUs comprise a plurality of coding units (CU) each identified as one of:
- a legacy CU having a corresponding macro-block (MB) or sub-MB partition in the previously encoded bitstream; and
- an extended CU corresponding to multiple MBs in the previously encoded bitstream,
- wherein the CUs are checked to determine partition size and prediction mode and for legacy CUs, a partition size is checked corresponding to a partition size used in the previously encoded bitstream and if the partition size is in a current division depth the partitioning will stop splitting into smaller partitions, while for extended CUs, partitions and modes are checked based on the MBs covered by the extended CU.

19. The system of claim 18, wherein after determining the partition size and prediction mode, reference pictures are selected by:
- for Prediction Units (PUs) in legacy CUs, reference pictures for corresponding MB or sub-MB partitions in the previously encoded bitstream are checked; and for PUs in extended CUs all reference pictures for the inter MBs covered by the prediction units are checked.

* * * * *